United States Patent [19]
Tsukihiji et al.

[11] Patent Number: 5,954,284
[45] Date of Patent: Sep. 21, 1999

[54] SPINNING REEL FOR FISHING

[75] Inventors: Muneaki Tsukihiji; Yukinori Miyazawa, both of Tokyo, Japan

[73] Assignee: Daiwa Seiko, Inc., Tokyo, Japan

[21] Appl. No.: 09/016,269

[22] Filed: Jan. 30, 1998

[30] Foreign Application Priority Data

Jan. 31, 1997 [JP] Japan ................................. 9-018336

[51] Int. Cl.⁶ .................................................. A01K 89/01
[52] U.S. Cl. ........................ 242/231; D22/141; 242/157 R
[58] Field of Search ................................ 242/231, 232, 242/230, 157 R, 615.2; D22/141

[56] References Cited

U.S. PATENT DOCUMENTS 3,278,137  10/1966  Hartley ............................. 242/157 R
5,769,344   6/1998  Kaneko et al. ....................... 242/231

FOREIGN PATENT DOCUMENTS 6-46467    6/1994  Japan .
3020798   11/1995  Japan .
08023834   1/1996  Japan .
8-308444  11/1996  Japan .

Primary Examiner—Katherine A. Matecki
Attorney, Agent, or Firm—Sughrue, Mion, Zinn, Macpeak & Seas, PLLC

[57] ABSTRACT

In a spinning reel for fishing, a plurality of line guide portions are formed in a line roller, so that one of the fishing line guide portions can be selected and used by changing the mounting position or mounting direction of the line roller with respect to a support member. The spinning reel for fishing with such line roller is able to cope with or use a wide variety of fishing lines having different diameters.

20 Claims, 6 Drawing Sheets

SPINNING REEL FOR FISHING

BACKGROUND OF THE INVENTION

The present invention relates to a spinning reel for fishing.

Conventionally, as known well, in a spinning reel for fishing, a semicircular-shaped bail is mounted on the leading ends of a pair of support arms provided in a rotor through a pair of support members in such a manner that it can be freely reversed between a fishing line take-up position side and a fishing line play-out position side, and a line roller for guiding a fishing line from the tip end of a fishing rod toward a spool is mounted on one of the two support members.

And, if the bail is reversed to the fishing line take-up position and the rotor is rotated in the fishing line take-up direction by operating a handle, then the fishing line is wound through the line roller around the spool which, in linking with the rotation of the rotor, traverses in the longitudinal direction thereof. On the other hand, if the bail is reversed to the fishing line play-out position side and the terminal tackles of the fishing rod is thrown, then the fishing line wound around the spool can be played out in a spiral manner.

That is, conventionally, in the spinning reel for fishing of this type, there is employed such structure that, when the fishing line is taken up, the line roller is rotated around the spool to thereby guide the fishing line from the tip end of the fishing rod toward the spool. However, with use of this structure, not only the rotation of the rotor causes the fishing line (outer line) to be twisted, but also the path of the fishing line cannot be stabilized due to variations in the position of the line roller with respect to a fishing rod guide, due to variations in the winding diameter of the fishing line to be wound around the spool, due to variations in the position of the longitudinally traversing spool, and the like, so that the fishing line can be slid in the axial direction of the line roller on the outer peripheral surface of the line roller as the fishing line is taken up onto the spool, which is known a great factor in causing the fishing line to be twisted.

In view of the above, in recent years, as disclosed in Japanese Utility Model Publication No. 6-46467 of Heisei, Japanese Registered Utility Model Publication No. 3020798, and Japanese Patent Publication No. 8-308444 of Heisei, there has been proposed a structure of a type that a guide groove is formed on the outer peripheral surface of the line roller, or, in the line roller, there is provided a guide portion with which the fishing line can be contacted in the fishing line take-up operation to thereby restrict the movement of the fishing line on the outer peripheral surface of the line roller in the axial direction thereof so as to prevent the fishing line from being twisted unnecessarily.

Also, in Japanese Patent Publication No. 8-23834 of Heisei, there is disclosed a spinning reel for fishing structured such that a restricting portion for restricting the movement of the fishing line in the fishing line take-up operation is provided in the peripheral edge portion of the line roller and also the outer peripheral surface of the line roller is formed in a tapered surface. According to this spinning reel for fishing, not only the restricting portion restricts the movement of the fishing line on the outer peripheral surface of the line roller in the axial direction thereof to thereby be able to prevent the fishing line from being twisted on the line roller, but also the tapered shape of the outer peripheral surface of the line roller is used to give the fishing line the reversed rotation to the rotor rotation to thereby be able to reduce greatly the twisting of the outer part of the fishing line caused by the rotor rotation.

However, in actual fishing, the fishing line to be wound around the spool must be selected according to the kind and size of the fish to be angled, fishing methods and the like; that is, out of many kinds of fishing lines, a fishing line having a proper diameter is selected and used.

Therefore, in the conventional spinning reel for fishing structured such that a single guide groove is formed on the outer peripheral surface of the line roller to thereby restrict the movement of the fishing line in the axial direction of the line roller, only the fishing line having a diameter corresponding to the groove width of the guide groove can be used. That is, this conventional spinning reel for fishing is restricted by the fishing line used so that it is not able to use a wide variety of fishing lines due to the restrictions relating to the diameters of the fishing lines.

Also, in the conventional spinning reel for fishing structured such that the outer peripheral surface of the line roller is formed in a tapered surface as well, since the preferred taper angle of the tapered surface varies according to the diameters of the fishing lines. In other words, in the conventional spinning reels for fishing, in order to be able to cope with a wide variety of fishing line diameters, it is inconveniently necessary to prepare a plurality of spinning reels respectively mounting therein line rollers in which the groove widths of the guide grooves are different according to the diameters of the fishing lines used, or in which the taper angles of the tapered surfaces are different according to the diameters of the fishing line used.

Further, when the guide groove of the line roller is worn due to use for a long period of time, the present line roller must be replaced with a new line roller; that is, such line roller replacement requires another operation, which results in the inefficient operation of the spinning reel.

SUMMARY OF THE INVENTION

The present invention aims at eliminating the drawbacks found in the above-mentioned conventional spinning reels for fishing. Accordingly, it is a first object of the invention to provide a spinning reel for fishing which is not restricted by fishing lines used but is able to use a wide variety of fishing lines having different line diameters and also, even when a line roller is worn due to use for a long period of time, can relieve an operation to replace the worn line roller with a new line roller.

And, it is a second object of the invention to provide a spinning reel for fishing which not only prevents a fishing line from being twisted unnecessarily when the fishing line is taken up, but also is able to use a wide variety of fishing line having different line diameters.

In attaining the above objects, the invention provides the following spinning reel for fishing.

(1) A spinning reel for fishing which comprises: a rotor rotatably mounted on a reel main body; a spool which is supported by the reel main body through a spool shaft and around which a fishing line can be wound when the rotor is rotated by operating a hand-operated handle; and a line roller which is mounted on the rotor through a support member and also which, when a fishing line is taken up, guides the fishing line from the tip end portion of a fishing rod toward the spool. There are provided a plurality of fishing line guide portions in the line roller, and one of the plurality of fishing line guide portions can be selected and used by changing the mounting position or direction of the line roller with respect to the support member.

(2) In the spinning reel for fishing as set forth in (1), the plurality of fishing line guide portions are respectively made up of restricting portions provided on the peripheral edge portions of the line roller for restricting the movement of a fishing line when the fishing line is taken up, and tapered surfaces decreasing in diameter sequentially from the central portion of the line roller toward the restricting portions, and the tapered surfaces of the plurality of fishing line guide portions are different in the taper angles thereof from one another.

(3) In the spinning reel for fishing as set forth in (1), the plurality of fishing line guide portions are respectively made up of guide grooves so formed in the outer peripheral surface of the line roller as to extend in the peripheral direction thereof and equal in groove width to one another, and the guide grooves are arranged in parallel to one another in the axial direction of the line roller.

(4) In the spinning reel for fishing as set forth in (1), the plurality of fishing line guide portions are respectively made up of guide grooves so formed in the outer peripheral surface of the line roller as to extend in the peripheral direction thereof and different in groove width from one another, and the guide grooves are arranged in parallel to one another in the axial direction of the line roller.

(Operation)

According to the spinning reel for fishing as set forth in (1), if the plurality of fishing line guide portions are so formed as to be identical in structure with one another, when one of the fishing line guide portions is worn, another fishing line guide portion can be used by changing the mounting position or direction of the line roller.

Also, if the plurality of fishing line guide portions are formed to be different in structure from one another to thereby be able to cope with different fishing line diameters, then the fishing line guide portions that correspond to the fishing line diameters can be used by changing the mounting position or mounting direction of the line roller.

According to the spinning reel for fishing as set forth in (2), if any one of the fishing line guide portions is selected by changing the mounting position or mounting direction of the line roller according to the fishing line diameters, then not only the restricting portions can restrict the movement of the fishing line in the axial direction of the line roller to thereby prevent the fishing line from being twisted on the line roller, but also the tapered surface, in accordance with the fishing line diameters, can prevent the outer part of the fishing line from being twisted when the fishing line is taken up and causes the inner part of the fishing line to be twisted in the opposite direction to the twisting of the fishing line due to the rotation of the rotor. And, such twisting of the fishing line inner part will cancel out the twisting of the fishing line caused when the fishing line is played out, so that both of these twistings can be solved.

Further, according to the spinning reel for fishing as set forth in (3), when any one of the guide grooves is worn because it is used for a long period of time, another one of the guide grooves can be used as a replacement by changing the mounting position or mounting direction of the line roller.

And, in the take-up operation of the fishing line, the guide groove restricts the movement of the fishing line in the axial direction of the line roller to thereby prevent the fishing line from being twisted on the line roller.

According to the spinning reel for fishing as set forth in (4), if one of the guide grooves is selected according to the fishing line diameters by changing the mounting position or mounting direction of the line roller, then the thus selected guide groove can restrict the movement of the fishing line in the axial direction of the line roller to thereby prevent the fishing line from being twisted on the line roller.

DETAILED DESCRIPTION OF THE PREFERRED EMBODIMENTS

Now, description will be given below in detail of the embodiments of a spinning reel for fishing according to the invention with reference to the accompanying drawings.

Figure 1:
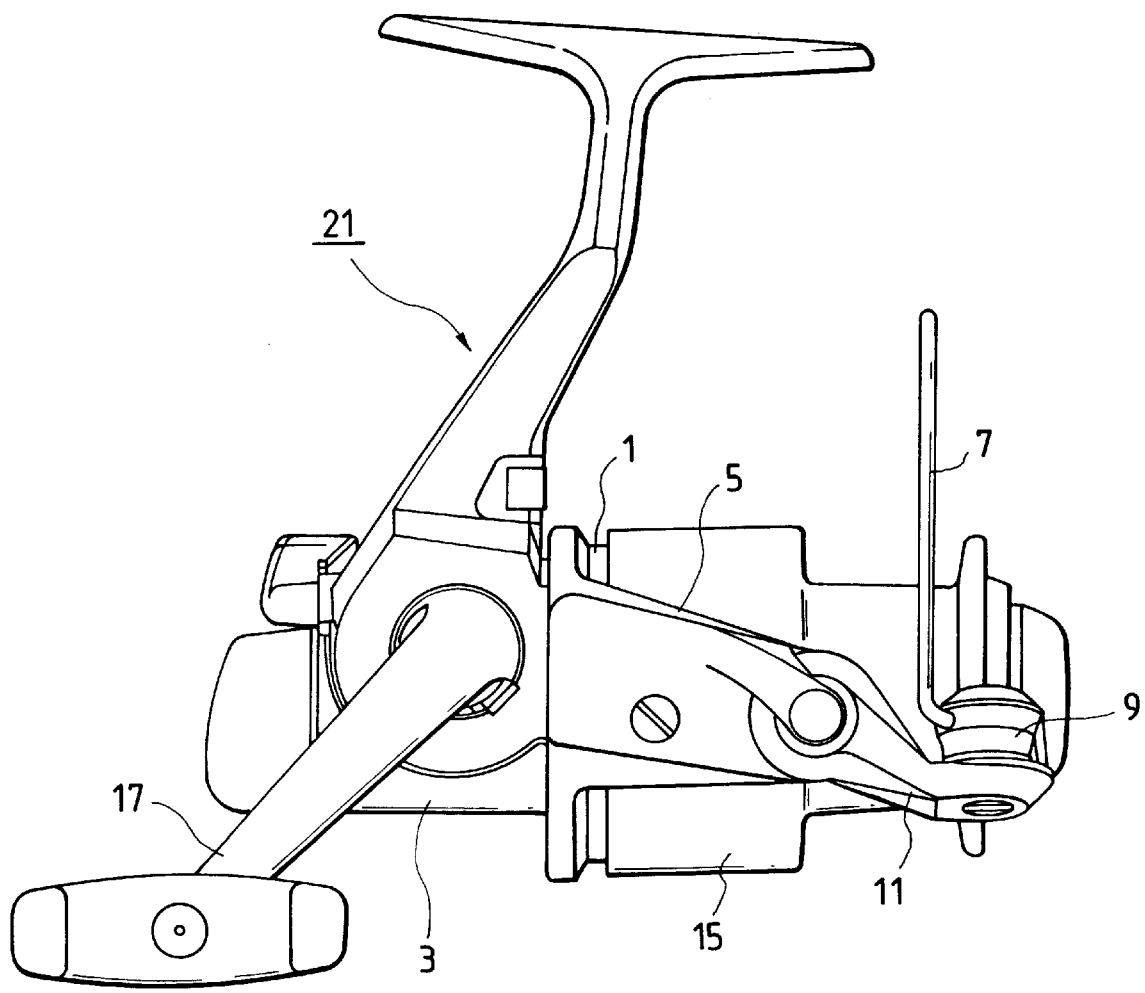
FIG. 1 is a side view of a spinning reel according to an embodiment of the invention.

In particular, FIGS. 1 to 4 show an embodiment of a spinning reel for fishing according to the invention. In FIG. 1, reference character 1 designates a rotor which is rotatably mounted on a reel main body 3, while a pair of bail support arms 5 are formed integrally with the rotor 1.

Figure 2:
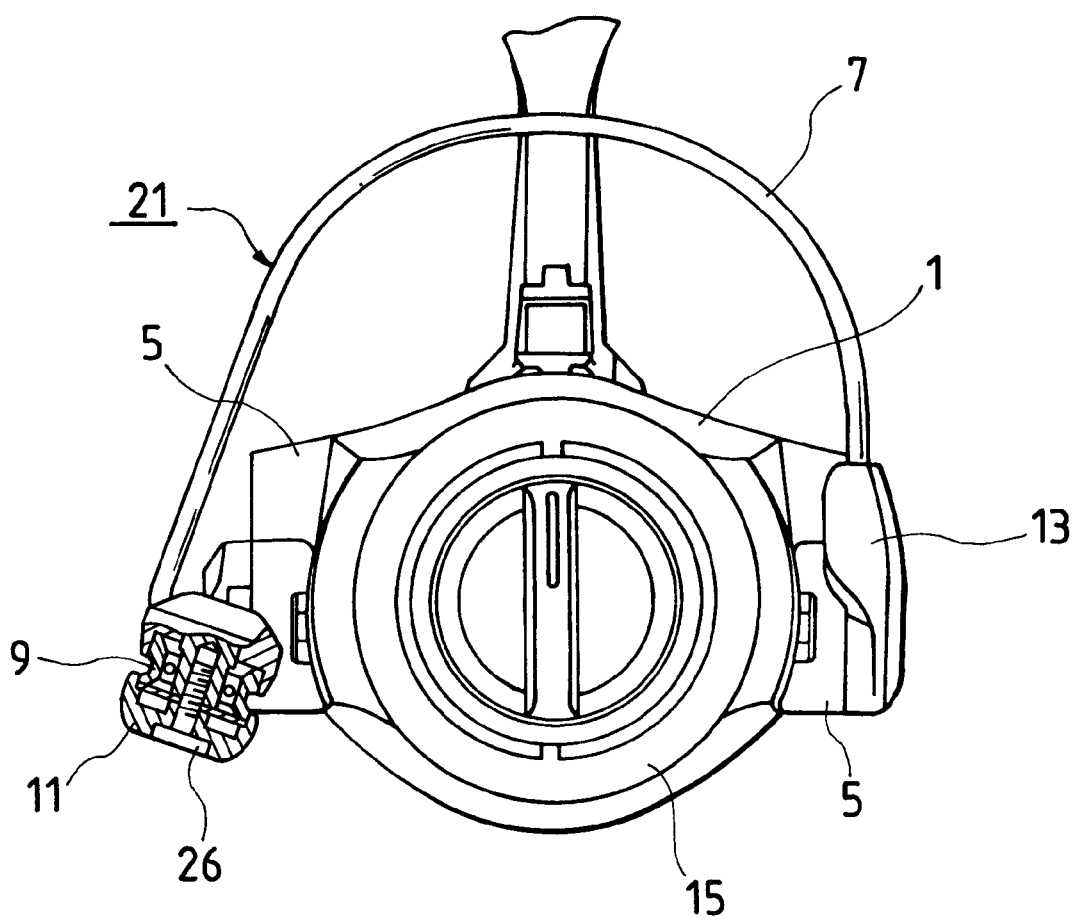
FIG. 2 is a partially cutaway front view of the spinning reel shown in FIG. 1.

And, as shown in FIG. 2, a semiannularly-shaped bail 7 is mounted on the leading ends of the two bail support arms 5 through a bail arm 11 with a line roller 9 mounted thereon and a bail holder 13 in such a manner that the bail 7 can be freely reversed between a fishing line take-up position side and a fishing line play-out position side.

Also, reference character 15 designates a spool which is coaxially arranged with respect to the rotor 1. This spool 15 is supported on a spool shaft (not shown) which can be traversably mounted on the reel main body 3, and, similarly to the conventional spinning reel for fishing, if the bail 7 is reversed to the fishing line take-up position side and the rotor 1 is rotated in a fishing line take-up rotation direction by means of operation of a handle 17, then a fishing line 19 can be wound around the spool 15 which traverses in the longitudinal direction thereof in linking with the fishing line take-up rotation of the rotor 1.

In a spinning reel 21 according to the present embodiment, in addition to the above-mentioned structure which is similar to the conventional spinning reel, a plurality of fishing line guide portions are formed in the line roller 9, while one of the fishing line guide portions can be selected and used by changing the mounting direction of the line roller 9 with respect to the bail arm 11.

Figure 3:
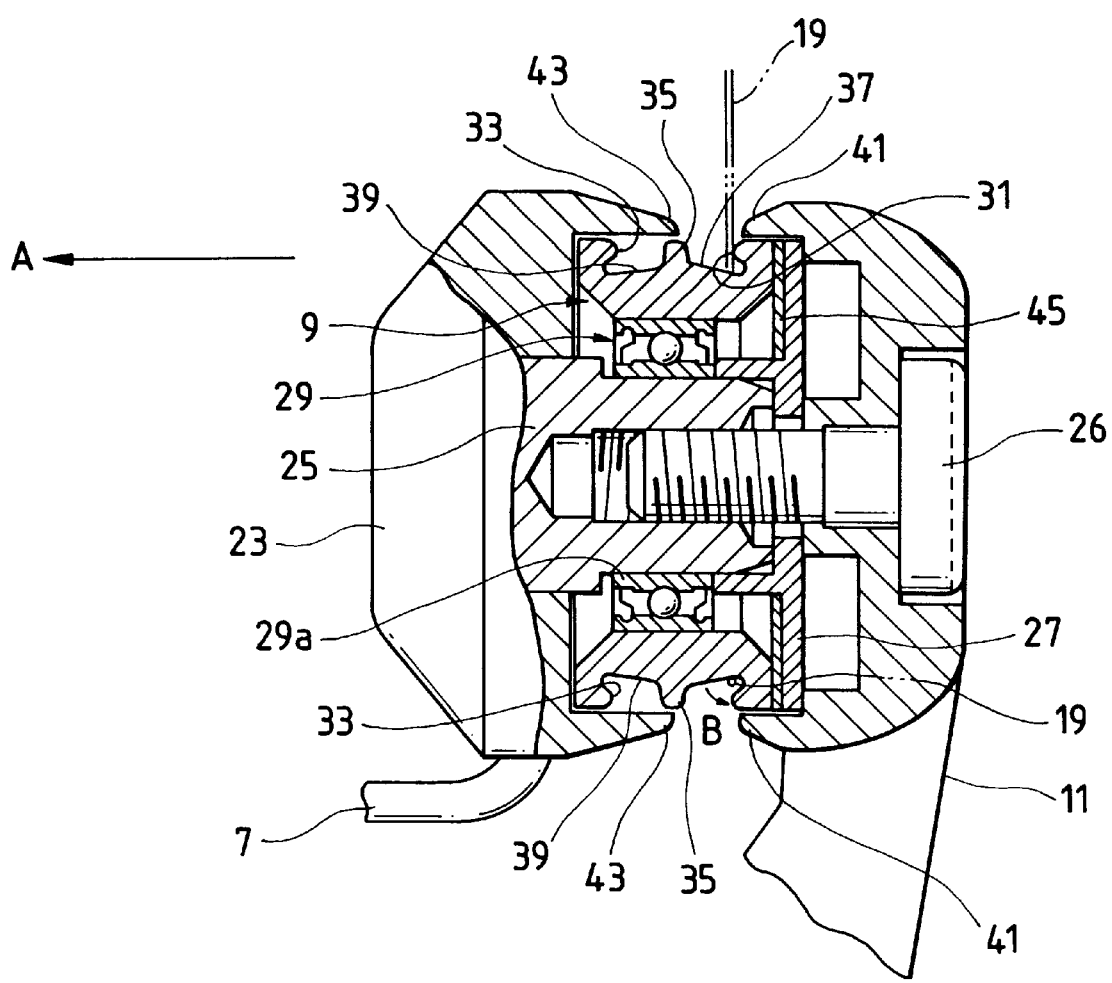
FIG. 3 is an enlarged section view of the main portions of a mounting structure for a line roller mounted on the spinning reel shown in FIG. 1.

Now, describing the characteristic features of this structure in detail, FIG. 3 shows a section view of a mounting structure for the line roller 9, in which reference character 23 designates a line slider. The line slider 23 is fixed to the bail arm 11 by a bolt 26 through a support shaft 25 which is formed of metal and is fitted with the line slider 23. A cylindrical member 27 formed of metal is placed on the bail arm 11 side end portion of the support shaft 25 and, in particular, by fastening the support shaft 25 to the bail arm 11 by the bolt 26, the present cylindrical member 27 is held by and between the support shaft 25 and bail arm 11.

And, the inner race 29a of a ball bearing 29 is contacted with the end portion of the cylindrical member 27 to thereby mount the ball bearing 29 on the outer periphery of the support shaft 25, while the line roller 9 is rotatably mounted on the support shaft 25 through the ball bearing 29. If the bolt fastening between the support shaft 25 and bail arm 11 is removed, then not only the line roller 9 can be removed easily but also the line roller 9 can be supported on the support shaft 25 in such a manner that it can be rotated while changing the right and left directions thereof.

On the right and left peripheral edge portions of the line roller 9, as shown in FIG. 3, there are formed integrally therewith annular-shaped restricting portions 31 and 33 with their respective leading ends projecting toward the central portion of the line roller 9; and, in the central portion of the outer peripheral surface of the line roller 9, there is formed a disk-shaped partition wall 35 which projects outwardly and extends along the peripheral (circumferential) direction of the line roller 9.

And, on the outer peripheral surface of the line roller 9, there are formed tapered surfaces 37 and 39 which respectively decrease in diameter sequentially from the partition wall 35 toward the two restricting portions 31 and 33 and are different in the taper angles thereof from each other. In particular, the tapered surface 37 having a larger taper angle and the restricting portion 31 function as a fishing line guide portion for guiding a large-diameter fishing line; and, if the line roller 9 is removed from the bail arm 11 and, as shown by a two-dot chained line in FIG. 4, the right and left mounting directions of the line roller 9 are changed over to each other, then the tapered surface 39 having a smaller taper angle and the restricting portion 33 function as a fishing line guide portion for guiding a small-diameter fishing line.

Also, as shown in FIG. 3, in the bail arm 11 and line slider 23, respectively, there are disposed annular-shaped guide portions 41 and 43 which project in the axial direction of the line roller 9 and are used to cover their respective restricting portions 31 and 33, while the guide portion 43 disposed on the line slider 23 side is extended up to the partition wall 35.

In addition, in FIG. 3, reference character 45 designates a washer which is formed of fluorine-system resin (such as Teflon (a registered trademark) or the like) and is mounted between the line roller 9 and cylindrical member 27.

Generally, as the material of a line roller, there are often used various kinds of hard materials such as ceramics and those which can be obtained by performing a hard plating treatment on the ceramics or copper alloy; and, the above-mentioned line roller 9 is also formed of one of such hard materials.

Also, the taper angles of the tapered surfaces 37 and 39 may be set in the range of 1°–10°. However, these taper angles are to be set properly according to the size of a spinning reel in its design stage and, therefore, the taper angles are not limited to the above-mentioned range at all.

As the present embodiment is structured in the above-mentioned manner, after the line roller 9 is mounted onto the bail arm 11 in such a mounting direction as shown in FIG. 3, if the bail is reversed to the fishing line take-up position side and the rotor 1 is rotated in the fishing line take-up rotation direction (in FIG. 3, in a direction of an arrow A) by operating the handle 17, then the fishing line 19 is wound around the spool 15 that traverses in the longitudinal direction in linking with the rotation of the rotor 1. Since the tapered surface 37 is formed in such a tapered manner that it increases sequentially toward the fishing line take-up rotation direction, in association with the fishing line take-up operation the fishing line 19 is given a force which causes itself to be rotated in a direction of an arrow B, that is, a force which causes the fishing line 19 to be rotated along the tapered surface 37, so that the fishing line 19 is caused to be twisted in the opposite direction to the direction in which it is twisted due to the rotor rotation, thereby preventing the outer part of the fishing line from being twisted; and, at the same time, in the fishing line (in particular, the inner part of the fishing line) to be wound on the spool 15, there is produced a twisting in the opposite direction to the twisting caused by the rotor rotation, and this twisting can be canceled out or removed by a twisting which is caused when the fishing line is played out.

And, the fishing line 19, which has been given the force that causes the fishing line 19 to rotate in the arrow B direction and thereby rotate along the tapered surface 37 through the fishing line take-up operation, is always contacted with the restricting portion 31 and is thereby restricted in the movement thereof in the axial direction of the line roller 9. That is, such restriction of the movement of the fishing line 19 on the outer peripheral surface of the line roller 9 in the axial direction of the line roller 9 can prevent the fishing line 19 from being twisted on the line roller 9.

Figure 4:
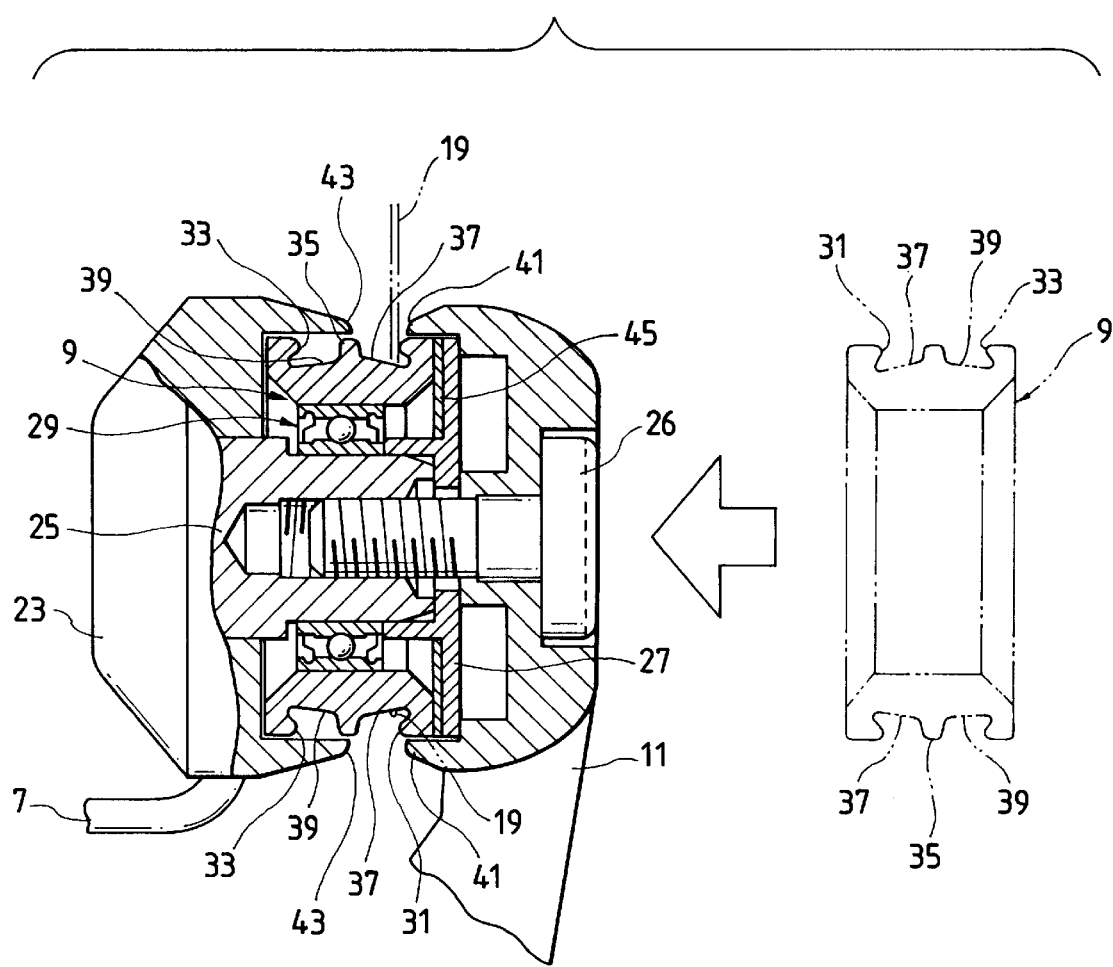
FIG. 4 is an enlarged section view of the main portions of a mounting structure for a line roller mounted on the spinning reel shown in FIG. 1.

Also, when a fishing line having a smaller diameter than the fishing line 19 is used according to the kind, size or the like of the fish to be angled, as described before, the bolt 26 may be removed and the line roller 9 may be thereby removed from the bail arm 11; and, as shown by the two-dot chained line in FIG. 4, the right and left mounting directions of the line roller 9 may be changed over to each other and thus the tapered surface 39 having a smaller taper angle and restricting portion 33 may be used as the fishing line guide portion.

In this case as well, if the rotor 1 is rotated in the fishing line take-up rotation direction by means of operation of the handle 17, then the fishing line is wound around the spool 15 that traverses back and forth in linking with the rotation of the rotor 1. However, since the tapered surface 39 is formed in such a tapered manner that it increases in diameter sequentially toward the fishing line take-up rotation direction, in association with the fishing line take-up operation the fishing line is given a force which causes the fishing line to be rotated along the tapered surface 39, so that the fishing line is twisted in the opposite direction to a twisting which is produced in the fishing line due to the rotor rotation, thereby preventing the outer part of the fishing line from being twisted; and, at the same time, in (the inner part of) the fishing line wound on the spool 15, there is produced a twisting in the opposite direction to the twisting due to the rotor rotation.

And, the fishing line, which has been given the force that causes the fishing line 19 to rotate along the tapered surface 37 through the fishing line take-up operation, is contacted with the restricting portion 33 and is thereby restricted in the movement thereof in the axial direction of the line roller 9. That is, such restriction of the movement of the fishing line on the outer peripheral surface of the line roller 9 in the axial direction of the line roller 9 can prevent the fishing line from being twisted on the line roller 9.

As described above, in the present embodiment, the two tapered surfaces 37 and 39 having different taper angles are formed on the outer peripheral surface of the single line roller 9, and, in the right and left peripheral edge of the line roller 9, respectively, there are formed the annularly-shaped restricting portions 31 and 33 with their respective leading ends projecting toward the central portion of the line roller 9, whereby, by changing the right and left mounting directions of the line roller 9 with respect to the bail arm 11, the tapered surface 37 and restricting portion 31 can function as the fishing line guide portion for a large-diameter fishing line, and the tapered surface 39 and restricting portion 33 can function as the fishing line guide portion for a small-diameter fishing line. Due to this, even when fishing lines having different diameters are used, execution of a simple operation to change the right and left mounting directions of the line roller 9 makes it possible to prevent production of an unnecessary twisting in the fishing line when the fishing line is taken up; and, at the same time, there is eliminated a troublesome problem that a plurality of spinning reels respectively mounting thereon line rollers differing in taper angle according to the diameters of the fishing lines used must be prepared. That is, the present embodiment is able to use a wide variety of fishing lines which are different in diameters.

Figure 5:
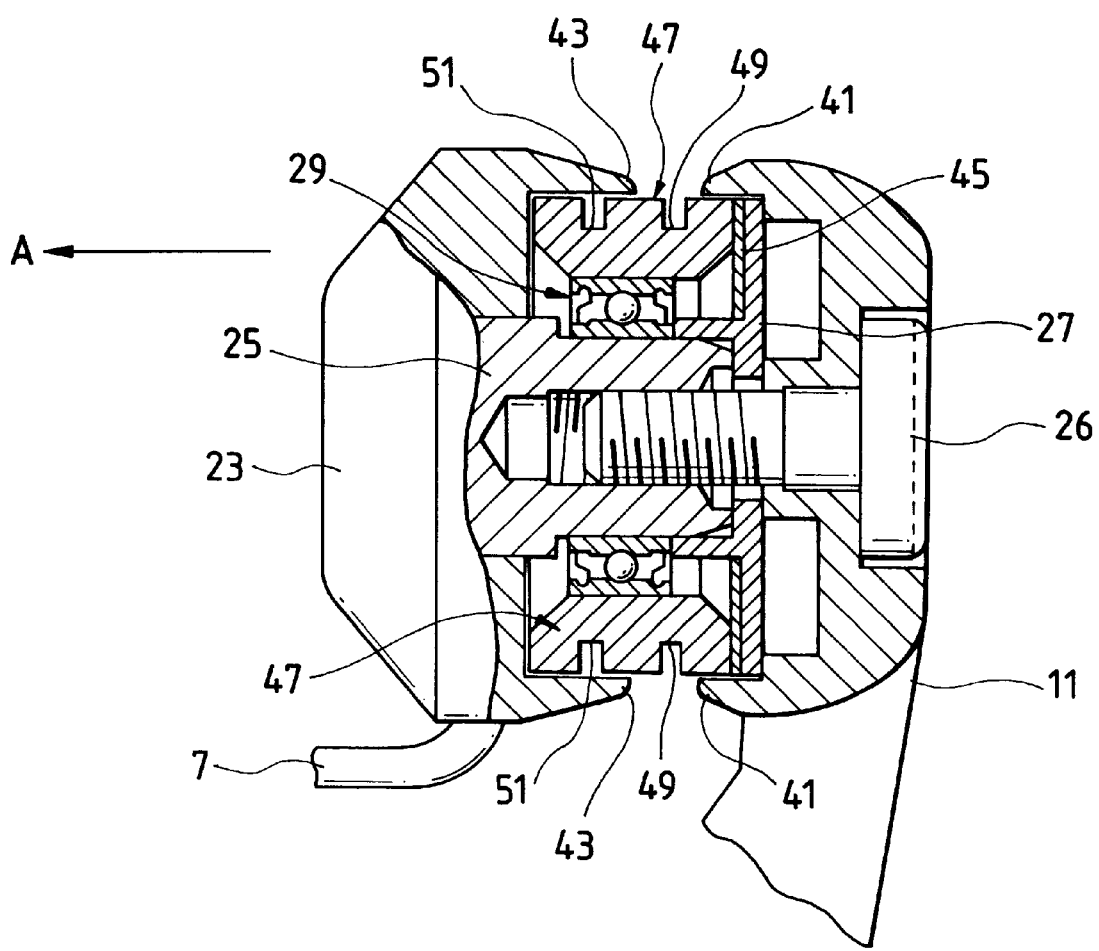
FIG. 5 is an enlarged section view of the main portions of a mounting structure for a line roller mounted on a spinning reel according to another embodiment of the invention.

Now, FIG. 5 shows an embodiment of a mounting structure for mounting a line roller to be mounted on a spinning reel for fishing according to the invention, and description will be given below of the present embodiment with reference to FIG. 5. The other portions of the present embodiment than the inventive portion thereof are similar in structure to those employed in the previously described embodiment. Therefore, the following description will be given of only the inventive portion of the present embodiment, while the same components are given the same designations and thus the description thereof is omitted here.

In FIG. 5, reference character 47 designates a line roller which, similarly to the previously described line roller 9, is rotatably mounted on the support shaft 25 through the ball bearing 29. By removing the bolt fastening between the support shaft 25 and bail arm 11, not only the line roller 47 can be removed easily but also the line roller 47 can be supported on the support shaft 25 in such a manner that it can be rotated while changing the right and left mounting directions thereof as the need arises.

And, the line roller 47, which is so formed as to have a cylindrical outer shape, includes on the outer peripheral surface thereof two guide grooves 49 and 51 which extend in the peripheral direction of the line roller 47 and are equal in groove width to each other; and, in particular, the two guide grooves 49 and 51 are arranged in parallel to each other in the axial direction of the line roller 47 with the same distance from the right and left end sides of the line roller 47. If the line roller 47 is mounted on the bail arm 11 in such a state as shown in FIG. 5, then one guide groove 51 is to be covered with the guide portion 43 of the line slider 23.

Since the present embodiment is structured in this manner, if the line roller 47 is mounted onto the bail arm 11 in such a direction as shown in FIG. 5, the bail 7 is reversed to the fishing line take-up position side, and the rotor 1 is rotated in the fishing line take-up rotation direction (in FIG. 5, in a direction of an arrow A) by means of operation of the handle, then the fishing line 19 is wound around the spool 15 which traverses back and forth in linking with the rotation of the rotor 1. In this case, the fishing line 19 is always guided into the guide groove 49 and thus the movement of the fishing line 19 in the axial direction of the line roller 47 can be restricted, which in turn can prevent the fishing line 19 from being twisted on the line roller 47.

Also, when the opening edge portion or the like of the guide groove 49 is worn due to use for a long period of time, the bolt 26 may be removed, the line roller 47 may be then removed from the bail arm 11, and the guide groove 51 may be situated on the bail arm 11 side by changing the right and left mounting directions of the line roller 47 over to each other.

Accordingly, in this case as well, in the fishing line take-up operation, the guide groove 51 can restrict the movement of the fishing line 19 in the axial direction of the line roller 47 to thereby be able to prevent the fishing line 19 from being twisted on the line roller 47.

As described above, according to the present embodiment, not only the occurrence of the unnecessary twisting in the fishing line in the take-up operation of the fishing line can be prevented, but also, when any one of the guide grooves 49 and 51 formed in the line roller 47 is worn due to use for a long period of time, the other of the guide grooves 49 and 51 can be used by changing the right and left mounting positions of the line roller 47 over to each other. Thanks to this, when compared with the conventional structures, an operation to replace the old worn line roller with a new one is reduced by half, that is, the present embodiment is more efficient than the conventional structures in the after-operation such as the replacement of the line rollers and the like.

Figure 6:
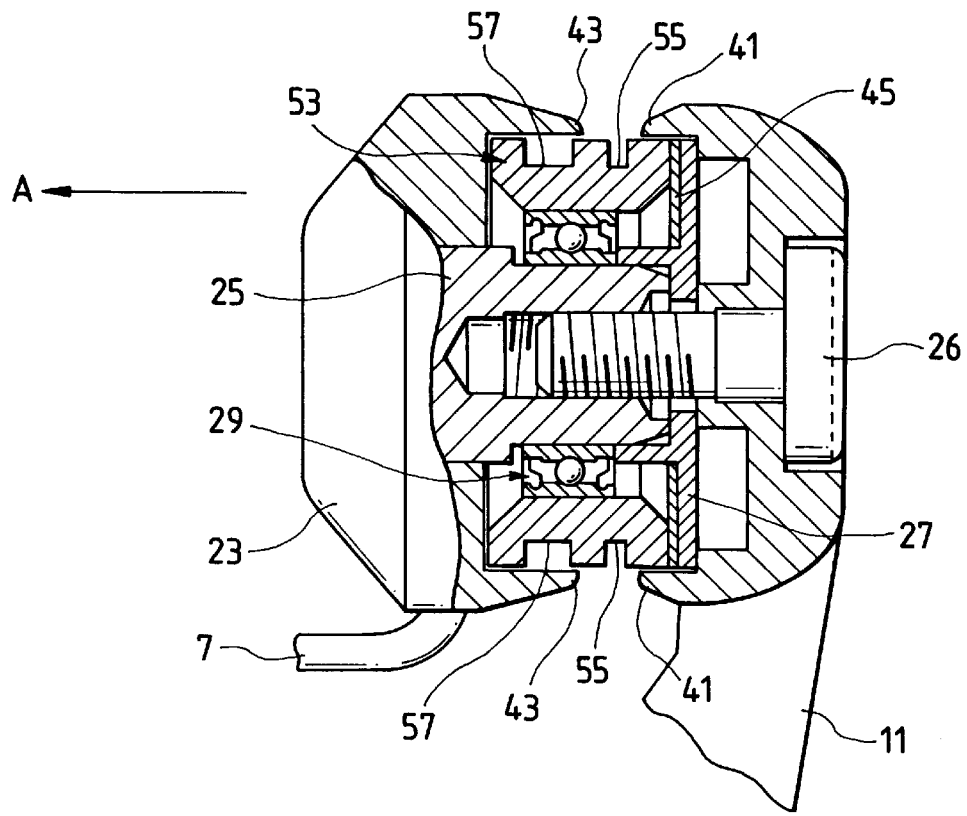
FIG. 6 is an enlarged section view of the main portions of a mounting structure for a line roller mounted on a spinning reel according to yet another embodiment of the invention; and, FIG. 7 is an enlarged section view of the main portions of a mounting structure for a line roller mounted on a spinning reel according to further another embodiment of the invention.

Now, FIG. 6 shows an embodiment of a mounting structure for mounting a line roller to be mounted on a spinning reel for fishing according to the invention.

In the present embodiment as well, the same components thereof as those employed in the previously described embodiment shown in FIG. 1 are given the same designations.

In FIG. 6, reference character 53 designates a line roller mounted on the bail arm 11 through the ball bearing 29. Similarly to the previously described respective embodiments of the invention, not only the line roller 53 can be removed easily by removing the bolt fastening between the support shaft 25 and bail arm 11, but also the line roller 53 can be supported on the support shaft 25 in such a manner that it can be rotated while changing the right and left mounting directions thereof as the need arises.

And, the line roller 53, which is so formed as to have a cylindrical outer shape, includes on the outer peripheral surface thereof two guide grooves 55 and 57 which extend in the peripheral direction of the line roller 53 and are different in groove width from each other; and, in particular, the two guide grooves 55 and 57 are arranged in parallel to each other in the axial direction of the line roller 53 while they are equidistant from the right and left end sides of the line roller 53. If the line roller 53 is mounted on the bail arm 11 in such a state as shown in FIG. 6, then the guide groove 51 having a larger groove width is to be covered with the guide portion 43 of the line slider 23 and, on the other hand, if the right and left mounting directions of the line roller 53 are changed over to each other, then the guide groove 55 having a smaller groove width is to be covered with the guide portion 43.

Since the present embodiment is structured in this manner, if the line roller 53 is mounted onto the bail arm 11 in such a direction as shown in FIG. 6, the bail 7 is reversed to the fishing line take-up position side, and the rotor 1 is rotated in the fishing line take-up rotation direction (in FIG. 6, in a direction of an arrow A) by means of operation of the handle, then the fishing line 19 is wound around the spool 15 which traverses back and forth in linking with the rotor rotational movement. In this case, the fishing line 19 is always guided into the guide groove 55 and thus the movement of the fishing line 19 in the axial direction of the line roller 53 can be restricted, which in turn can prevent the fishing line 19 from being twisted on the line roller 53.

Also, when using a fishing line having a larger diameter than the illustrated fishing line 19 according to the kind, size or the like of the fish to be angled, the line roller 53 may be removed from the bail arm 11, the right and left mounting directions of the line roller 53 may be changed over to each other, and the guide groove 57 having a larger groove width may be used as a fishing line guide portion.

Accordingly, in this case as well, in the fishing line take-up operation, the guide groove 57 is sure to restrict the movement of the heavy fishing line 19 in the axial direction of the line roller 53 to thereby be able to prevent the heavy fishing line 19 from being twisted on the line roller 53.

As described above, according to the present embodiment as well, it is possible to prevent the occurrence of the unnecessary twisting in the fishing line 19 in the take-up operation of the fishing line 19.

And, by changing the right and left mounting directions of the line roller 53 with respect to the bail arm 11, the guide groove 55 can be used as a fishing line guide portion for a fine fishing line, while the guide groove 57 having a larger groove width than the guide groove 55 can be used as a fishing line guide portion for a heavy fishing line. Thanks to this, even when fishing lines having different diameters are used, such fishing lines can be properly dealt with according to the diameters of the fishing lines by a simple operation to change the right and left mounting directions of the line roller 53 over to each other. That is, according to the present embodiment, it is possible to solve a troublesome problem that a plurality of spinning reels respectively mounting thereon line rollers including guide grooves different in groove width must be prepared.

Figure 7:
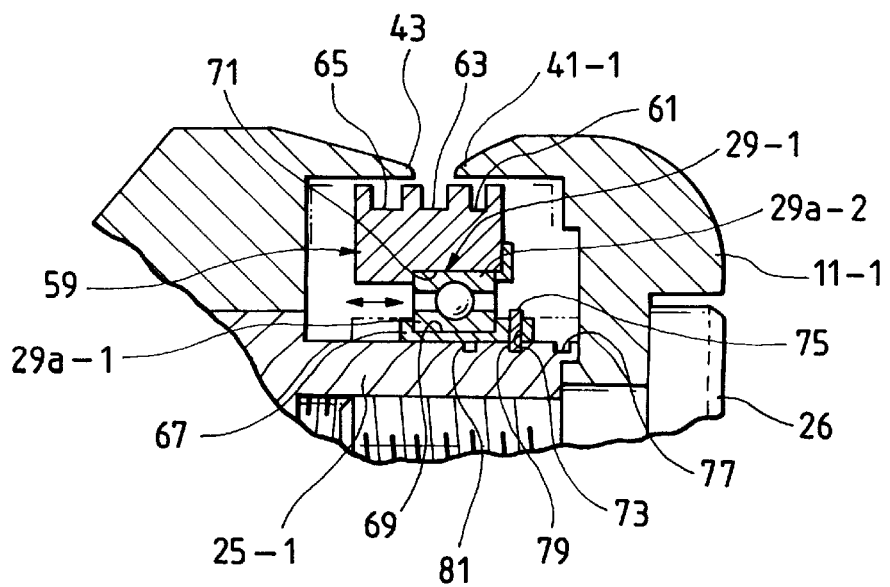

Now, FIG. 7 shows a mounting structure for mounting a line roller to be mounted on a spinning reel for fishing according to an embodiment of the invention.

In FIG. 7, reference character 59 designates a line roller which is mounted on a support shaft 25-1 through a ball bearing 29-1. And, the line roller 59, which is so formed as to have a cylindrical outer shape, includes on the outer peripheral surface thereof three guide grooves 61, 63 and 65 which are arranged in parallel to one another in the axial direction of the line roller 59, while these three guide grooves 61, 63 and 65 increase sequentially in groove width in this order.

As described above, the line roller 59 is mounted on the support shaft 25-1 through the ball bearing 29-1; and, in particular, the inner race 29a-1 of the ball bearing 29-1 is engaged with an engaging recessed portion 69 of a mounting member 67 which is mounted on the outer periphery of the support shaft 25-1, while the outer race 29a-2 of the ball bearing 29-1 is engaged with an engaging recessed portion 71 formed in the inner periphery of the line roller 59.

And, in the outer periphery of the support shaft 25-1, there are formed three securing holes 77, 79 and 81 which are arranged in the axial direction of the line roller 59 and to which a securing pin 75 can be secured, while the securing pin 75 is arranged such that it can be inserted through a pin insertion hole 73 formed in the mounting member 67. For example, as shown in FIG. 7, if the securing pin 75 is secured to the securing hole 79, then the guide groove 63 is situated between two guide portions 41-1 and 43.

Also, after the bolt fastening between the support shaft 25-1 and bail arm 11-1 is removed, if the mounting member 67 is slid in an arrow direction to thereby secure the securing pin 75 to the securing hole 77, then the guide groove 65 is situated between the guide portions 41-1 and 43; and, if the mounting member is slid in the arrow direction to thereby secure the securing pin 75 to the securing hole 81, then the guide groove 61 is situated between the guide portions 41-1 and 43.

By the way, the guide portion 41-1, when compared with the previously described guide portion 41, is extended further in the direction of the guide portion 43 on the line slider 23 side, while any one of the three guide grooves 61, 63 and 65 is to be situated between the two guide portions 41-1 and 43.

Since the present embodiment is structured in this manner, after the line roller 59 is fixed at such a position as shown in FIG. 7, if the bail 7 is reversed to the fishing line take-up position side and the rotor 1 is rotated in the fishing line take-up rotation direction by operating a handle, then the fishing line 19 is wound around the spool 15 which traverses back and forth in linking with the rotation of the rotor 1 but, since the movement of the fishing line 19 in the axial direction of the line roller 59 is restricted by the guide groove 63, the fishing line 19 is prevented from being twisted on the line roller 59.

Also, when using a fishing line having a larger diameter than the above-mentioned fishing line 19 according to the kind, size or the like of the fish to be angled, if the line roller 59 is slid together with the mounting member 67 in the arrow direction to thereby secure the securing pin 75 to the securing hole 77, then the guide groove 65 having a larger guide groove than the guide groove 63 is situated between the guide portions 41-1 and 43; and, on the other hand, when using a fishing line having a smaller diameter than the above-mentioned fishing line 19, if the line roller 59 is slid in the arrow direction to thereby secure the securing pin 75 to the securing hole 81, then the guide groove 61 having the smallest guide width is situated between the guide portions 41-1 and 43.

In these cases as well, the respective guide grooves 61 and 65 can restrict the movement of the fishing line 19 in the axial direction of the line roller 59 in the fishing line take-up operation, thereby being able to prevent the fishing line 19 from being twisted on the line roller 59.

Therefore, according to the present embodiment as well, not only it is possible to prevent the fishing line 19 from being twisted unnecessarily when the fishing line 19 is taken up, but also, if the line roller 59 is slid in the axial direction to thereby change its mounting position, then the spinning reel is able to cope with a wide variety of fishing lines having different diameters. This makes it possible to solve a troublesome problem that a plurality of spinning reels respectively mounting thereon line rollers including guide grooves different in groove width according to the different diameters of the fishing lines used must be prepared.

By the way, the structures and combinations of the fishing line guide portions are not limited to the above-mentioned respective embodiments but, for example, it is also possible to enforce another embodiment in which fishing line guide portions each consisting of a tapered surface and a guide groove are provided on the outer peripheral surface of a single line roller. According to the present embodiment as well, similarly to the above-mentioned respective embodiments, an expected object can be achieved.

Also, as in the above-mentioned respective embodiments, in the spinning reels of this type each of which mounts a bail, the bail arms are mounted on the bail support arm.

Conventionally, however, there are present many spinning reels which do not mount a bail.

And, in such conventional spinning reels, a support member corresponding to the above-mentioned bail arms is mounted on the rotor and a line roller is mounted on the support member. However, the present invention can also apply to the conventional spinning reels structured in this manner as well.

As has been described heretofore, according to the spinning reel for fishing as set forth in (1), since a plurality of fishing line guide portions are provided in a single line roller, when these fishing line guide portions are so formed as to have the same structure, one of the fishing line guide portions can be selected and used by a simple operation to change the mounting position or mounting direction of the line roller, which can solve a troublesome problem, which arises in the prior art, that a plurality of spinning reels respectively mounting different kinds of line rollers must be prepared.

And, when the above-mentioned plurality of fishing line guide portions are so formed as to have different structures, the present spinning reel is able to properly use a wide variety of fishing lines according to their diameters by a simple operation to change the mounting position or mounting direction of the line roller.

Also, according to the spinning reel for fishing as set forth in (2) to (4), in addition to the above-mentioned effects, it is possible to prevent a fishing line from being twisted due to the different diameters thereof when the fishing line is taken up.

What is claimed is:

1. A spinning reel for fishing, comprising:

a rotor rotatably mounted on a reel main body;

a spool supported by said reel main body through a spool shaft so that a fishing line can be wound therearound when said rotor is rotated by operating a hand-operated handle; and a line roller detachably mounted on the rotor through a support member in one of at least two available orientations relative to said support member, said line roller having a plurality of fishing line guide portions fuirther comprising a plurality of guide grooves spaced along an axial direction of said line roller, wherein said plurality of guide grooves are configured to guide fishing line onto said spool when said rotor is rotated by operating said hand-operated handle, and wherein the two available orientations respectively present a different one of said plurality of guide grooves for guiding the fishing line onto said spool.

2. A spinning reel for fishing as set forth in claim 1, wherein each of said fishing line guide portions includes a restricting portion on a peripheral edge portion of said line roller for restricting movement of said fishing line when said fishing line is taken up, and a tapered surface decreasing in diameter sequentially from a central portion of said line roller toward said restricting portion.

3. A spinning reel for fishing as set forth in claim 2, wherein said tapered surface of one of said guide portions is different in taper angle from said tapered surface of another of said guide portions.

4. A spinning reel for fishing comprising:

a rotor rotatably mounted on a reel main body;

a spool supported by said reel main body through a spool shaft so that a fishing line can be wound therearound when said rotor is rotated by operating a hand-operated handle; and a line roller detachably mounted on the rotor through a support member in one of at least two available orientations relative to said support member, for guiding the fishing line from a top portion of a fishing rod toward the spool when a fishing line is taken up, said line roller having a plurality of fishing line guide portions, wherein the two available orientations respectively present a different one of said plurality of fishing line guide portions for guiding the fishing line onto said spool, and wherein each of said plurality of fishing line guide portions includes a restricting portion on a peripheral edge portion of said line roller for restricting movement of said fishing line when said fishing line is taken up, and a tapered surface decreasing in diameter sequentially from a central portion of said line roller toward said restricting portion.

5. A spinning reel for fishing as set forth in claim 4, wherein said tapered surface of one of said plurality of guide portions is different in taper angle from said tapered surface of another of said plurality of guide portions.

6. A spinning reel for fishing comprising:

a rotor rotatably mounted on a reel main body;

a spool supported by said reel main body through a spool shaft so that a fishing line can be wound therearound when said rotor is rotated by operating a hand-operated handle; and a line roller detachably mounted on the rotor through a support member in one of at least two available orientations relative to said support member, for guiding the fishing line from a top portion of a fishing rod toward the spool when a fishing line is taken up, said line roller having a plurality of fishing line guide portions, wherein the two available orientations respectively present a different one of said plurality of fishing line guide portions for guiding the fishing line onto said spool, and wherein said plurality of fishing line guide portions respectively include guide grooves formed in an outer peripheral surface of said line roller and extending circumferentially around at least a portion of said outer peripheral surface, wherein said guide grooves are equal in groove width to one another and are arranged parallel to one another.

7. A spinning reel for fishing comprising:

a rotor rotatably mounted on a reel main body;

a spool supported by said reel main body through a spool shaft so that a fishing line can be wound therearound when said rotor is rotated by operating a hand-operated handle; and a line roller detachably mounted on the rotor through a support member in one of at least two available orientations relative to said support member, for guiding the fishing line from a top portion of a fishing rod toward the spool when a fishing line is taken up, said line roller having a plurality of fishing line guide portions, wherein the two available orientations respectively present a different one of said plurality of fishing line guide portions for guiding the fishing line onto said spool, and wherein said plurality of fishing line guide portions respectively include guide grooves formed in an outer peripheral surface of said line roller and extending circumferentially around at least a portion of said outer peripheral surface, wherein said guide grooves are different in groove width from one another and are arranged parallel to one another.

8. A spinning reel for fishing, comprising:

a rotor rotatably mounted on a reel main body;

a spool supported by said reel main body through a spool shaft for winding a fishing line therearound when said rotor is rotated by operating a hand-operated handle;

a line roller having a plurality of annular grooves spaced along an axial direction of said line roller; and a support mounting said line roller on said rotor so that one of said annular grooves selectively guides said fishing line from a top portion of a fishing rod toward said spool when said rotor is rotated to wind said fishing line around said spool.

9. A spinning reel for fishing as set forth in claim 8, wherein said support includes a ball bearing on which said line roller is fitted.

10. A spinning reel for fishing as set forth in claim 8, wherein each of said annular grooves is defined by a planar surface substantially orthogonal to said axial direction, a conical surface tapered with respect to said axial direction, and a restriction portion located opposite from said planar surface with respect to said conical surface.

11. A spinning reel for fishing as set forth in claim 10, wherein said restriction portion partially covers said conical surface with a clearance therebetween.

12. A spinning reel for fishing as set forth in claim 11, wherein each of said conical surface forms the same taper angle with respect to said axial direction.

13. A spinning reel for fishing as set forth in claim 11, wherein each of said conical surface forms a respective, different taper angle with respect to said axial direction.

14. A spinning reel for fishing as set forth in claim 8, wherein each of said annular grooves is defined by a first and second planar surfaces substantially orthogonal to said axial direction, and a cylindrical surface connecting said first and second planar surfaces.

15. A spinning reel for fishing as set forth in claim 14, wherein each of said cylindrical surface has the same axial length.

16. A spinning reel for fishing as set forth in claim 14, wherein each of said cylindrical surface has a respective, different axial length.

17. A spinning reel for fishing as set forth in claim 8, wherein each of said annular grooves has the same cross sectional shape.

18. A spinning reel for fishing as set forth in claim 8, wherein each of said annular grooves has a respective, different cross sectional shape.

19. A spinning reel, comprising:

a reel main body;

a handle rotatably attached to said reel main body;

a rotor rotatably mounted on said reel main body, said rotor including a base and a plurality of support members, each having a proximal end and a distal end, wherein said proximal ends are attached to said base and wherein said support members extend in a direction away from said handle and terminate in said distal ends; and a line roller selectively supported in either a first orientation or a second orientation on one of said support members, said line roller having a plurality of line guide portions further comprising a plurality of guide grooves.

20. A spinning reel as set forth in claim 19, wherein each of said line guide portions further comprises a restricting portion on a peripheral edge portion of said line roller and a tapered surface decreasing in diameter, relative to an axis of said line roller, from a central portion of said line roller toward said restricting portion.

* * * * *